Patented Sept. 2, 1947

2,426,790

UNITED STATES PATENT OFFICE 2,426,790

CHLORO-METHYLENE DERIVATIVE OF FATTY ACID AMIDES

Josef Pikl, Glassboro, N. J., assignor to E. I. du Pont de Nemours & Company, Wilmington, Del., a corporation of Delaware No Drawing. Application June 3, 1942, Serial No. 445,675

4 Claims. (Cl. 260—295)

This invention relates to the production of novel derivatives of behenic acid amide and other higher fatty acid amides.

It is an object of this invention to produce novel derivatives of behenic acid amide or other higher fatty acid amides possessing valuable properties as agents for producing water-repellent effects upon textile fiber or which may serve as useful intermediates for the production of such agents. It is another object of this invention to provide an efficient process for the production of the said intermediates. Other and further important objects of this invention will appear as the description proceeds.

It is old in the art to react higher fatty acid amides, by which expression I mean acid amides of the general formula R—CO—NH$_2$ wherein R is an alkyl or cyclo-alkyl radical of at least 9 carbon atoms, with formaldehyde-yielding agents and hydrogen chloride to produce corresponding N-methylene-chloride derivatives. The reaction is generally carried out in an organic liquid medium such as benzene, and the formaldehyde-yielding agent is generally paraformaldehyde or trioxymethylene.

The exact steps of procedure in the hitherto-known methods are typified by the following:

I. The selected acyl amide and paraformaldehyde are suspended jointly in benzene, and hydrogen chloride is passed into the warmed mixture.

II. The acyl amide is suspended in benzene, and hydrogen chloride and paraformaldehyde are simultaneously passed into the warmed mixture.

III. The acyl amide (or the corresponding carbamate of formula RO—CO—NH$_2$) is suspended in benzene and this mixture is saturated with hydrogen chloride. Paraformaldehyde is then passed in gradually.

IV. The procedure is as in I or II above, but instead of the monomeric amide the corresponding methylene-bis-acylamide of the formula

R—CO—NH—CH$_2$—NH—CO—R is employed.

It is believed by some experts in the art that the product from procedure IV is essentially the same as that obtained in procedures I and II, in view of the fact that the monomeric acylamide forms a bis-compound of the above formula in situ by reacting with formaldehyde.

Now, I have attempted to apply the above procedures to the amide obtained from behenic acid, namely C$_{21}$H$_{43}$—CO—NH$_2$, but found to my disappointment that the yields were very poor and that the products if converted further into water-repellency agents did not possess any exceptional qualities. This was very surprising inasmuch as I had found that, in certain other cases, water-repellency agents derived from behenic acid amide were decidedly superior in initial power and in washing resistance to analogous water-repellency agents derived from other higher fatty acylamides. (Cf. copending application Serial No. 445,674, of even date herewith.)

Now after considerable investigation I have found that the difficulty with the prior processes may be explained on the assumption that under the conditions of these prior processes there takes place first the formation of a bis-compound, probably N,N'-methylene-dibehenamide, by reaction in situ of two mols of behenamide with one mol of formaldehyde, and that the resulting compound, apparently due to its high degree of insolubility, is inert toward further quantities of formaldehyde and hydrogen chloride.

On the other hand, by modifying the process so as to suppress formation of the said bis-compound, I have succeeded in obtaining derivatives of behenic acid amide which are characterized by possessing CH$_2$Cl groups, and which, as a result, have the power of reacting further in the manner hereinafter set forth to produce water-repellency agents of very high qualities.

Accordingly, my present invention consists of reacting behenic acid amide with formaldehyde-yielding agents and hydrogen chloride under conditions which will avoid the formation of substantial quantities of methylene-dibehenamide. I achieve this object by modifying the steps of procedure in such a manner as to avoid any high concentrations of behenic acid amide in the presence of the formaldehyde-yielding agent. Two procedures are possible for this purpose. Assuming that the reaction is carried out in a liquid medium such as benzene as in the other processes of the art, I may suspend the requisite quantity of paraformaldehyde or trioxymethylene in the benezene and then pass into it gradually from different sources of supply hydrogen chloride on the one hand and behenic acid amide on the other hand. Alternatively, I may pass all three reagents from different sources of supply into a vessel containing benzene. Or again, the formaldehyde and the behenic acid amide may be mixed together dry and passed gradually into a vessel containing benzene while simultaneously passing hydrogen chloride from another source into the vessel. It will be noted that in the last-mentioned case, although the paraformaldehyde is in constant contact with the behenic acid amide, the fact that the mixture is dry and is out of contact with hydrogen chloride prevents the formation of the undesirable bis-compound.

By proceeding in the above manner I have succeeded in obtaining compounds which according to their analyses contain between one and two behenamido chains per $CH_2Cl$ group. Without limiting my invention to any particular theory, I venture the hypothesis that the product probably consists principally of a bis-chloro-methylene-dimethylene-tribehenamido compound as represented by the following formula:

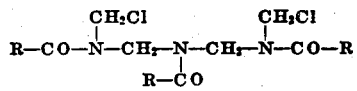

wherein R designates the radical $C_{21}H_{43}$.

Other possible components of the mixture are the corresponding methylene-bis-amido compounds of the formula:

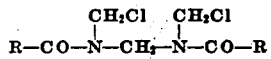

and a trimethylene-tetrabisamido compound of the probable formula:

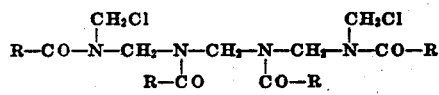

In all probability, all of these components are present in the products of my invention, the exact proportions of these in each case depending on the temperature, duration and other specific conditions of the reaction.

The above three different products are related in structure, and may be brought together under the general formula:

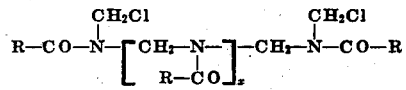

wherein $x$ stands for 0, 1 or 2.

The above intermediate products are very reactive and will form addition compounds with tertiary bases such as pyridine, picoline, quinoline, trimethyl-amine, triethyl-amine, dimethylaniline, piperidine, etc., to give a corresponding bis-quaternary-ammonium compound, that is, compounds wherein the $CH_2Cl$ groups in the above formulas become converted into the form $CH_2\text{-}N(tert)\text{-}Cl$, $N(tert)$ designating the molecule of a tertiary nitrogenous base. They will also react with thiourea to give the corresponding bis-isothiouronium chloride, that is, compounds wherein the $CH_2Cl$ groups become replaced by the radicals:

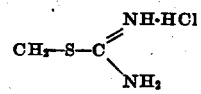

These quaternary and isothiouronium compounds are directly useful as water-repellency agents and may be applied to the fabric in the same manner as the known water-soluble water-repellency agents of the methylene-quaternary-ammonium-halogen type. Their effect on the fiber, however, is much more lasting, that is, much more resistant to repeated laundering than any of the quaternary-ammonium compounds within my experience to date.

Furthermore, the intermediate methylene-chloride compound above mentioned may be reacted with various agents to replace the chlorine atom by other anion radicals. For instance, the compound may be reacted with potassium-thiocyanate or lead-thiocyanate according to my copending application, Serial No. 363,524 (Pat. No. 2,331,276), whereby to replace the chlorine atoms by thiocyano radicals, SCN. These in turn may be reacted with pyridine or other tertiary amines to produce the corresponding quaternary-ammonium-thiocyanates, analogous to the compound described and claimed in my copending application, Serial No. 386,845 (Pat. No. 2,402,526).

On the other hand, if allowed to stand for some time without reacting with pyridine or other tertiary amines, the said thiocyanates undergo isomerization to give the corresponding isothiocyanates which may be applied to fabric from organic solution according to my said copending application Serial No. 363,524, but again give water-repellency effects on fiber which are outstanding in their high initial power and fastness qualities.

If, in the above series of reactions, hydrogen bromide is employed in lieu of hydrogen chloride the corresponding methylene-bromide derivative may be obtained.

Without limiting my invention the following examples are given to illustrate my preferred mode of operation. The parts mentioned are by weight.

*Example I*

Eighty-five parts of behenic-acid amide (M. P. 114° C.) were dissolved in 500 parts of hot benzene and the solution then gradually added to a suspension of 15 parts of paraformaldehyde in 200 parts of benzene heated to 80° C. while a stream of hydrogen chloride was passed into the reaction mixture. The reaction flask was connected through a water separator to a reflux condenser and provided with an agitator. In forty-five minutes the addition of the behenic-acid amide solution was complete, giving a clear reaction mixture. The solution was heated for another half hour to insure complete reaction and then evaporated in vacuo on the steam bath. The resulting chloromethylamide was a low melting wax which decomposed with water.

*Example II*

Eighty-five parts of the chloromethylamide obtained according to Example I were dissolved in 500 parts of carbon tetrachloride and then reacted with 80 parts of lead thiocyanate at 80° C. After the reaction was complete the solution was filtered from the inorganic salts, and the product, a tan colored low melting wax, was recovered from the solvent by evaporation. It was readily soluble in benzene and in carbon tetrachloride, and gave with pyridine a water-soluble quaternary ammonium salt. It analyzed as follows: nitrogen, 5.85%; sulfur, 5.57%.

The above analysis agrees closely with the empirical formula $C_{72}H_{137}O_3N_5S_2$, which would be required if the compound is a bis-(thiocyanomethylene)-dimethylene-tribehenamide as hypothesized in the general discussion above.

When this product was applied to cotton or wool from an organic solvent at a concentration of .5% and the latter then subjected to baking, in standard manner, i. e., at a temperature between 105 and 150° C., it gave a strongly water-repellent fabric, the properties of which were not impaired by washing in a boiling soap solution or by extraction with a warm dry-cleaning solvent. When tested according to the standard method for testing water-repellency (Am. Dyest. Reporter, vol. 31, p. 8), this fabric was found to be remarkably superior as regards "permanence" (i. e., fastness to laundering and dry-cleaning), to a fabric similarly treated with the thiocyanate obtained in analogous manner from stearic-acid amide.

*Example III*

One hundred thirteen parts of behenamide were dissolved in 500 parts of benzene and then added to a suspension of 20 parts of paraformaldehyde in 200 parts of benzene while passing in a stream of hydrogen chloride at the boiling point of the reaction mixture. In one hour all the amide had been added, and the heating of the clear solution was continued for another hour. The solvent was evaporated and a hard, waxy mass obtained as a residue. It contained 5.25% of chlorine. This is equivalent to about two fatty-acid-amides for each chlorine atom.

The above product reacted readily with triethylamine and pyridine to give water-soluble products which foamed strongly in warm water and which gave excellent water repellency when applied to cotton or regenerated cellulose from aqueous solution, followed by drying and heating in standard manner.

*Example IV*

Sixty parts of the chloromethylamide obtained in Example III were dissolved in 500 parts of carbon tetrachloride and reacted at 80° C. for one hour with 60 parts of lead thiocyanate. The inorganic salts were filtered off and a clear, light straw-colored solution was obtained. On evaporation of the solvent, the product analyzed at 5.46% nitrogen and 4.33% sulfur, which is about equivalent to two long-chain amido radicals for each sulfur atom.

This product gave excellent water repellency when applied, in standard manner, to cotton, wool or rayon.

Although the above discussion and examples have been limited particularly to behenic acid amide, in view of the difficulty of converting this amide into a chloro-methylene compound by the older processes, my invention is nevertheless of a generic nature and may be applied also to such amides which encounter no special difficulties by the old processes. Thus they may be applied to stearamide, lauramide, montanic-acid amide, and in general to any amide of the formula R—CO—NH$_2$, wherein R is an alkyl or cyclo-alkyl radical of at least nine carbon atoms.

Moreover, the same reaction may be applied with good success to the conversion of carbamates of the general formula

R'—O—CO—NH$_2$ into corresponding chloro-methylene derivatives, R' being an alkyl or cyclo-alkyl radical of at least 10 carbon atoms. In particular, when R' stands for $C_{22}H_{45}$, which is the alkyl radical obtained by hydrogenation of behenic acid, a chloro-methylene compound is obtained of similar reactive properties as the compounds above discussed, and of similar high-grade qualities as water-repellency agents.

*Example V*

Forty-five and one-tenth parts of docosyl carbamate,

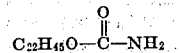

were dissolved in 250 parts of benzene and added to a suspension of 7.5 parts of para-formaldehyde in 100 parts of benzene while passing in a stream of hydrogen chloride gas at the boiling point of the reaction mixture. The addition took thirty minutes. The heating was continued for half an hour longer and then the solvent was evaporated. The hard, waxy solid contained 5.09% of chlorine. The product reacted readily with triethylamine and pyridine, giving the corresponding quaternary ammonium salts which were soluble in warm water.

*Example VI*

Thirty parts of the chloromethyl compound contained in Example V were dissolved in 300 parts of carbon tetrachloride and then reacted at 80° C. with 30 parts of dry lead thiocyanate for one hour. The filtrate obtained from the inorganic salts contained 4.57% of sulfur and 5.23% nitrogen. It gave excellent water repellency when applied to wool, cotton or regenerated cellulose at a concentration of one or one-half per cent and then subjected for a few minutes to a heat treatment in standard fashion.

*Example VII*

The thiocyanate obtained in Example VI was dissolved in a little benzene and then reacted with half of its weight of pyridine. After several hours the originally clear solution set to a thick paste which gave a strongly foaming aqueous solution.

The pyridinium thiocyanate was applied to cotton from aqueous solution and from carbon tetrachloride, followed by a baking treatment in standard fashion. In both cases the repellency obtained was very good when applied at concentrations of .5% and .25%, based on the weight of the fabric.

It will be understood that many other variations and modifications are possible in the procedures above outlined without departing from the spirit of this invention.

I claim:

1. In the process of producing a halogen-methylene derivative of behenic-acid-amide by reacting behenic-acid-amide with a formaldehyde-yielding agent and hydrogen halide in an organic liquid, the improvement which consists of bringing the reactants together in such a manner as to avoid any appreciable concentration of the amide in the solvent as long as there is available in the same mass unconsumed formaldehyde.

2. The process of converting behenic-acid-amide into a reaction product possessing CH$_2$Cl groups attached to nitrogen atoms, which comprises suspending paraformaldehyde in an organic liquid medium, and passing gradually and simultaneously into said mass hydrogen chloride and behenic-acid-amide.

3. A composition of matter being a reaction product of behenic-acid-amide, paraformaldehyde and hydrogen chloride, and whose predominant constituent is the compound having the formula

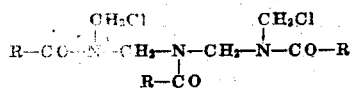

wherein R designates the radical $C_{21}H_{43}$.

4. A composition of matter being the pyridine addition compound of the reaction product of behenic-acid-amide, paraformaldehyde and hydrogen chloride, said composition of matter being constituted predominantly by the compound having the formula

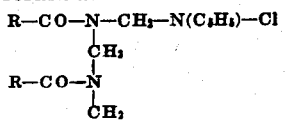

wherein R designates the radical $C_{21}H_{43}$.

JOSEF PIKL.

REFERENCES CITED

The following references are of record in the file of this patent:

UNITED STATES PATENTS

| Number | Name | Date |
|---|---|---|
| 2,331,276 | Pikl | Oct. 5, 1943 |
| 2,338,178 | Graenacher | Jan. 4, 1944 |
| 2,338,177 | Graenacher | Jan. 4, 1944 |
| 2,301,352 | Wolf | Nov. 10, 1942 |
| 2,255,252 | Harris | Sept. 9, 1941 |
| 2,131,362 | Baldwin | Sept. 27, 1938 |
| 2,242,565 | Wolf | May 20, 1941 |
| 2,296,412 | Wolf | Sept. 22, 1942 |
| 2,302,885 | Orthner | Nov. 24, 1942 |
| 2,019,121 | Reival | Oct. 29, 1935 |
| 2,277,267 | Bruson | Mar. 24, 1942 |
| 1,456,702 | Matheson | May 29, 1923 |
| 1,551,176 | Skirrow | Aug. 25, 1925 |

OTHER REFERENCES

Systematic Organic Chemistry, Cumming, 1926, N. Y. Van Nostrand, pp. 208–10, 265, 266.

Certificate of Correction

Patent No. 2,426,790.  September 2, 1947.

JOSEF PIKL

It is hereby certified that errors appear in the printed specification of the above numbered patent requiring correction as follows: Column 1, line 32, and column 2, line 50, for "benezene" read *benzene*; column 3, line 36, for "tetrabisamido" read *tetrakisamido*; column 7, line 10, claim 3, for "whrein" read *wherein*; and that the said Letters Patent should be read with these corrections therein that the same may conform to the record of the case in the Patent Office.

Signed and sealed this 4th day of November, A. D. 1947.

[SEAL]

THOMAS F. MURPHY,
*Assistant Commissioner of Patents.*